United States Patent
Kajihara

(10) Patent No.: US 7,557,959 B2
(45) Date of Patent: Jul. 7, 2009

(54) IMAGE PROCESSING METHOD, IMAGE PROCESSING APPARATUS, AND PROGRAM

(75) Inventor: Rie Kajihara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 595 days.

(21) Appl. No.: 11/266,028

(22) Filed: Nov. 3, 2005

(65) Prior Publication Data
US 2006/0098219 A1    May 11, 2006

(30) Foreign Application Priority Data
Nov. 5, 2004    (JP)    ............... 2004-322751

(51) Int. Cl.
*H04N 1/40*    (2006.01)
(52) U.S. Cl. .............. 358/2.1; 358/504; 358/518
(58) Field of Classification Search .......... 358/1.9, 358/2.1, 502, 504, 518–520, 527, 406
See application file for complete search history.

(56) References Cited

U.S. PATENT DOCUMENTS

| | | | |
|---|---|---|---|
| 5,339,365 A * | 8/1994 | Kawai et al. | 382/176 |
| 6,373,595 B1 * | 4/2002 | Semba et al. | 358/1.9 |
| 7,308,139 B2 * | 12/2007 | Wentland et al. | 382/181 |

FOREIGN PATENT DOCUMENTS

| JP | 2002-223362 A | 8/2002 |
|---|---|---|
| JP | 2002-232727 A | 8/2002 |

* cited by examiner

*Primary Examiner*—Thomas D Lee
*Assistant Examiner*—Stephen M Brinich
(74) *Attorney, Agent, or Firm*—Canon U.S.A. Inc., I.P. Division

(57) ABSTRACT

In an image processing method for color conversion that converts image data into the amount of color material to be used in printing, the amount of color material that can be obtained in the color conversion by converting black represented by image data is changed into an amount of color material that reduces saturation.

9 Claims, 5 Drawing Sheets

IMAGE PROCESSING METHOD, IMAGE PROCESSING APPARATUS, AND PROGRAM

BACKGROUND OF THE INVENTION

1. Field of the Invention

The present invention relates to an image processing method, image processing apparatus, and program that can increase visual black density and improve tone reproducibility.

2. Description of the Related Art

Today, image output apparatuses, such as color printers and copiers, are expected to provide high print quality. Among the requirements for achieving such high print quality are reduced granularity of printed images, improved color matching with monitor colors and with memory colors, improved tone reproducibility, and increased black density. A number of image processing techniques have been proposed to meet these requirements.

Of the requirements described above, black density exhibits variations that are particularly significant in low-luminance images, such as in nightscape images. For example, low black densities produce faded and blurry images. Therefore, higher black densities are required to prevent blurry images from being produced.

Densities, including black densities, can be measured by the spectral characteristics of reflected light. However, the spectral characteristics are variously affected by the characteristics of recording media. The examples include the color, smoothness, and oil absorbency of the recording media, and the characteristics of their coating material, such as fluorescent material. Japanese Patent Laid-Open No. 2002-223362 discloses a method in which a gray scale is controlled by adjusting a hue angle so that a desired gray level can be reproduced regardless of the types of recording media. That is, what is disclosed is a method for achieving target black densities and natural grayscale images. Moreover, Japanese Patent Laid-Open No. 2002-232727 discloses a method in which a visual check allows the correction of a shift in gray balance or in color that occurs at the time of the replacement of recording paper.

The method disclosed in Japanese Patent Laid-Open No. 2002-223362 adjusts gray levels based on the assumption that optically measured data is equivalent to the current gray level. However, a gray level obtained by this adjustment may differ from that visually obtained. This is because when actual samples are evaluated, black densities determined by measurements differ from those determined by visual checks. Black densities that are actually high may not be able to be obtained, in particular, by visual checks.

Although Japanese Patent Laid-Open No. 2002-232727 discloses a method in which a visual check allows the correction of a shift in gray balance, there is no suggestion in this document for achieving higher visual black densities.

SUMMARY OF THE INVENTION

To solve the problems described above, the present invention provides an image processing method and image processing apparatus that can increase visual black densities and achieve smooth grayscale printing.

According to one aspect of the present invention, in an image processing method for color conversion that converts image data into an amount of color material to be used in printing, the amount of color material that can be obtained in the color conversion by converting black represented by image data is changed into an amount of color material that reduces saturation.

According to another aspect of the present invention, the change for reducing the saturation is performed, in equivalent luminance expressed by the sum of measured luminance and luminance depending on the color, by reducing the luminance depending on the color.

Further features of the present invention will become apparent from the following description of exemplary embodiments with reference to the attached drawings.

DESCRIPTION OF THE EMBODIMENTS

Embodiments of the present invention will now be described with reference to the drawings.

Figure 1:
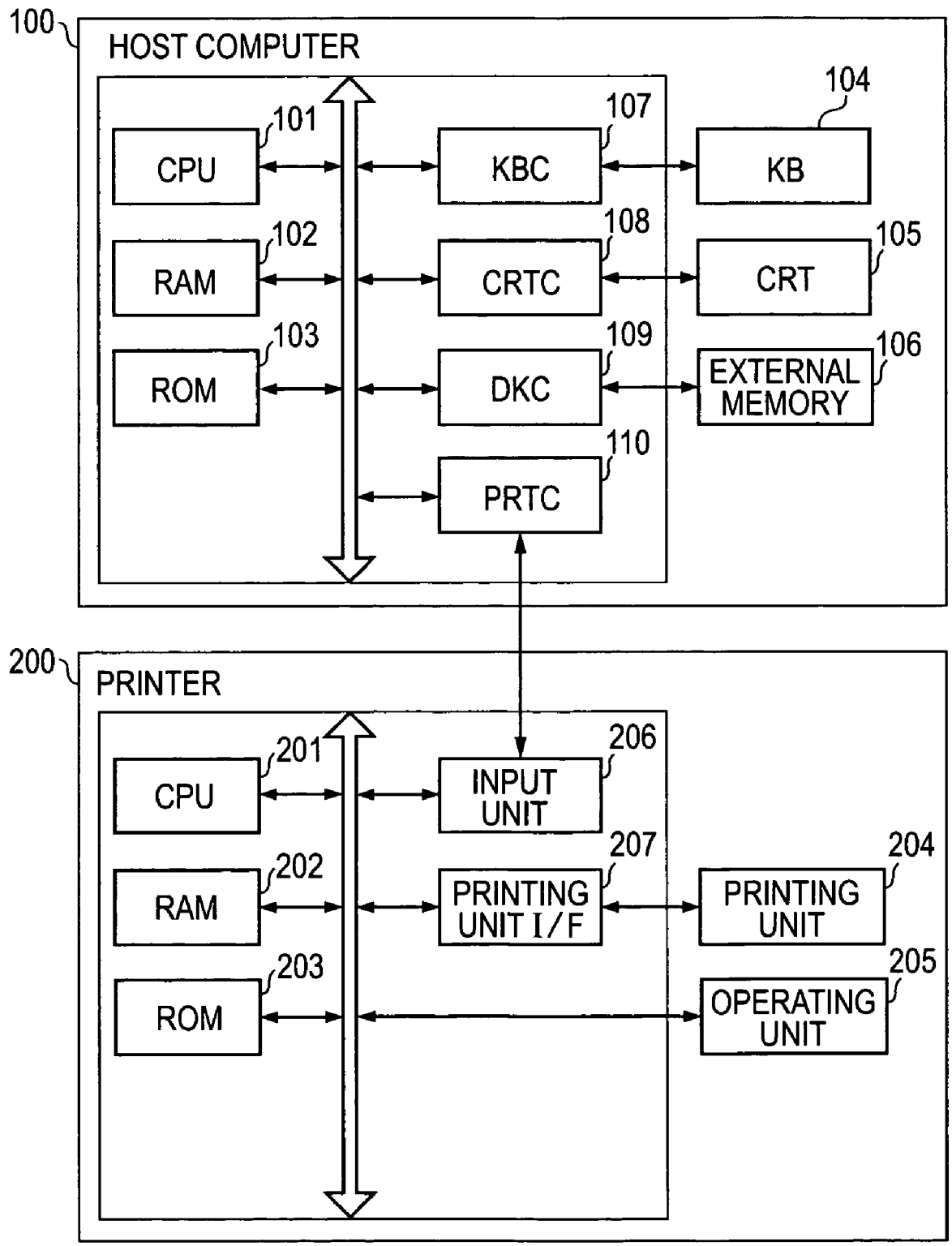
FIG. 1 is a block diagram showing the overall structure of a host computer according to an embodiment of the present invention, and a printer that performs printing according to print data supplied from the host computer.

FIG. 1 is a block diagram showing the overall structure of a host computer according to an embodiment of the present invention, and a printer that performs printing according to print data supplied from the host computer.

A host computer 100 is a personal computer or the like, and includes a control section having a central processing unit (CPU) 101, a keyboard (KB) 104 serving as an input device, a cathode-ray tube (CRT) display 105 serving as a display device, and an external memory 106. The CPU 101 in the control section controls the computer according to programs stored in a read-only memory (ROM) 103 or the like. At the same time, the CPU 101 generates a table (described below) according to the processing of a printer driver. A random-access memory (RAM) 102 is used as a work area for the CPU 101 to perform the control operations described above. According to the operations of the CPU 101, a keyboard controller (KBC) 107 controls the input of the keyboard 104, while a CRT controller (CRTC) 108 controls the display of the CRT display 105. An external memory controller (DKC) 109 controls read/write with respect to the external memory 106, such as a hard disk. A printer controller (PRTC) 110 controls print operations in a printer 200 according to the control operations of the CPU 101 based on the printer driver.

The host computer 100 having the structure described above performs the creation of a color conversion table (described below with reference to FIG. 2) as an operation mainly based on the printer driver.

The printer 200 performs print operations based on print data and the like supplied from the host computer 100. A CPU 201 controls print operations and the like in the printer 200 based on programs stored in a ROM 203. A RAM 202 is used as a work area for the CPU 201 to perform control operations.

An input unit 206 receives print data and print control data from the host computer 100, while sending information about the status of the printer 200 to the host computer 100. A printing unit 204 serving as a printing operation mechanism performs print operations according to print signals and control signals transmitted via a printing unit interface (I/F) 207. A print mechanism of the embodiment includes a recording head for ejecting color material, such as cyan (C), magenta (M), yellow (Y), and black (K) ink for printing. According to print signals, the recording head performs recording by ejecting ink onto a transferred recording medium, such as recording paper. An operating unit 205 provides operating buttons that allow the user to input various commands to the printer 200.

In the embodiments of the present invention, the contents of print data supplied from the host computer to the printer, according to the structure described above, enable visual black density to increase when printing is performed based on the print data. This basic idea will now be described.

Optical density (O.D.) representing the density of print is given by the equation as follows:

$$O.D. = -\log \sum_{visible\ range} R(\lambda)\bar{y}(\lambda)S(\lambda) \quad \text{Equation 1}$$

where $R(\lambda)$ is spectral reflectance at each wavelength obtained from measurements with a spectrophotometer, $\bar{y}(\lambda)$ is a spectral tristimulus value in the XYZ color system and is equivalent to standard spectral luminous efficiency $V(\lambda)$. $S(\lambda)$, which is normally International Commission on Illumination (CIE) standard illuminant D50 or D65, is the relative spectral distribution of a light source.

As can be seen in Equation 1, the visual evaluation of O.D is ensured by using the standard spectral luminous efficiency $V(\lambda)$. However, although the value of the standard spectral luminous efficiency reflects visual characteristics, "darkness" and "density" in actual visual evaluations correspond to "luminance." Therefore, actual visual evaluations may vary significantly depending on the visual environment (intensity and color of light, luminance and color of objects constituting the space, and so on). In other words, an evaluation of the "density of black" requires considerations of both "O.D. obtained by measurement (evaluation based on standard spectral luminous efficiency)" and "luminance" in the XYZ color system.

The embodiments of the present invention incorporate the Helmholtz-Kohlrausch effect (under the same brightness condition, longer or shorter wavelength regions with high saturation have high visual luminance). This effect is quantified by determining "equivalent luminance."

Equivalent luminance $L^*_{eq}$ reflecting the analysis of effects of, for example, saturation, hue, and luminance level during measurement is expressed as follows:

$$L^*_{eq} = L^*_{ach} + L^*_{chr} \quad \text{Equation 2}$$

where the luminance of an achromatic color is $L^*_{ach}$, and the luminance depending on the color is $L^*_{chr}$. If evaluations for Equation 2 are normally made in sufficiently bright light, the luminance of an achromatic color can be expressed as $L^*_{ach}=L$, and Equation 2 can be modified by quantifying the luminance depending on the color $L^*_{chr}$ according to the $L^*a^*b^*$ color system as follows:

$$\begin{aligned}L^*_{eq} &= L^*_{ach} + L^*_{chr} \quad \text{Equation 3}\\ &= L^* + f(\theta) \cdot C \cdot K(E) \\ &= L^* + \{0.116|\sin((\theta - 90)/2)| + 0.085\} \cdot \\ & \quad C \cdot [2.5 - 0.025L^*]\end{aligned}$$

Equation 3 shows that although the measured luminance $L^*_{ach}=L^*$ is evaluated in the evaluation of O.D., the evaluation of the lightness of chromatic colors $L^*_{chr}$ is not taken into consideration.

On the other hand, in the embodiments of the present invention, since the second term $L^*_{chr}$ in the right side of Equation 3 does not become negative, if a hue coefficient $f(\theta)$ is the same or if the effect of the hue coefficient is small, $L^*_{chr}$ becomes zero and equivalent luminance $L^*_{eq}$ becomes the minimum if C is the minimum, that is, if saturation=0. Specifically, in Equation 3, the lower the saturation, that is, the closer the achromatic axis $(a^*, b^*)=(0, 0)$, the lower the equivalent luminance. Since a lower equivalent luminance means a higher visual density, reducing the luminance $L^*_{chr}$ in equivalent luminance increases black density.

In the embodiments of the present invention, the luminance $L^*_{chr}$ in equivalent luminance in a look-up table (LUT) used in color conversion by the printer driver of the host computer 100 is minimized to increase black density.

First Embodiment

Color conversion is the process of converting RGB (red-green-blue) image data, which is brightness data, into image data corresponding to the amounts of CMYK ink used in printers. An LUT used in this process stores the amounts of CMYK ink as grid point data corresponding to grid points determined by RGB values. Of grid point data in the LUT, according to the present embodiment, grid point data (C, M, Y, K) corresponding to a grid point (R, G, B)=(0, 0, 0), in particular, is changed from preset data to data that reduces luminance $L^*_{chr}$ in equivalent luminance. The grid point (R, G, B)=(0, 0, 0) will also be referred to as a "black point." Thus, the visual black density of a printed black point in RGB image data can be increased. While grid point data is changed in this example, the process described above may be performed on a black point at the stage when the LUT is initially created. The creation of an LUT not only refers to the creation of an LUT from the beginning, but also refers to modifications to an LUT as in this example.

Specifically, an LUT is created for each of the types of recording media that may be used in the printer 200. In the creation of each LUT, grid point data (C, M, Y, K) corresponding to a black point (R, G, B)=(0, 0, 0) in an LUT preset for each recording medium is supplied to the printer 200, by which sample images for the black point are printed. At the same time, the printer 200 prints cyan, magenta, yellow, and black sample images using a predetermined amount of ink for each of the CMYK colors. Then, the spectral reflection characteristics of these sample images are measured.

Figure 2:
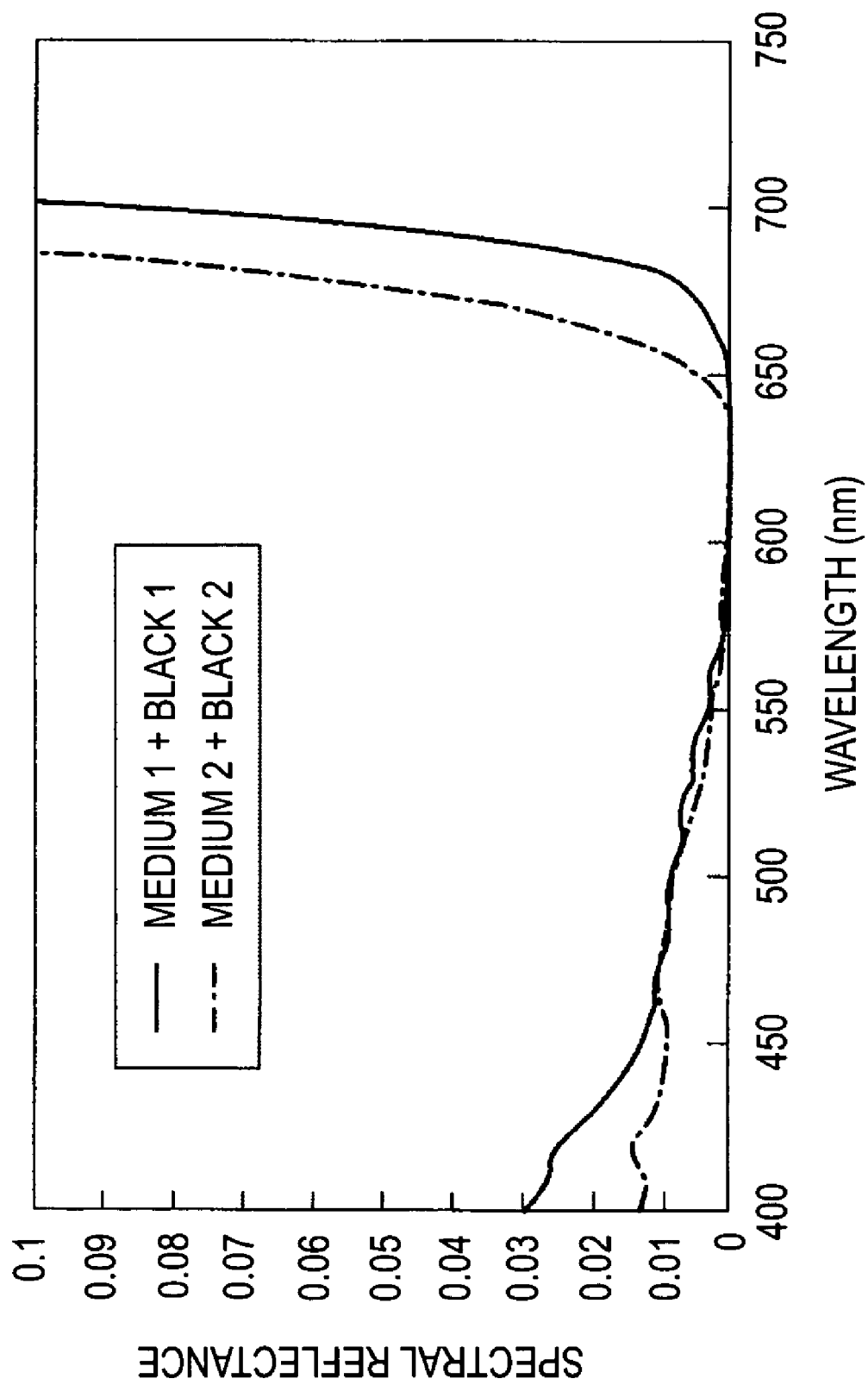
FIG. 2 shows spectral reflection characteristics, by taking sample images of a black point as examples, with respect to each of two types of recording media.

FIG. 2 shows spectral reflection characteristics, by taking sample images of a black point as examples, with respect to each of two types of recording media. As shown in FIG. 2, the spectral reflection characteristics of the sample images printed based on the same CMYK grid point data (black point data) vary depending on the type of recording medium. As described above, in the present embodiment, LUTs are modified with respect to each recording medium.

In the process of creating an LUT in the host computer 100, as described above, measured spectral reflection characteristics data for sample images of a black point and for cyan, magenta, yellow, and black sample images are initially input.

For example, data for sample images measured with a spectrophotometer or a scanner is directly input therefrom, or is input by a user.

Next, the ratio of the amounts of cyan, magenta, yellow, and black ink to be added to ink for printing a black point is examined so that the ratio that minimizes saturation can be determined.

Specifically, multiplying the spectral reflectances of cyan, magenta, yellow, and black sample images by various coefficients produces results (1). Thus, the spectral reflectances of various amounts of cyan ink, various amounts of magenta ink, various amounts of yellow ink, and various amounts of black ink can be estimated. Each of the results (1) is further multiplied by the above-measured spectral reflectance of a black point. Spectral reflectances when various amounts of C, M, Y, and K ink are added to ink for printing a black point are thus obtained.

Then, saturation values are determined on the basis of the obtained spectral reflectances. Specifically, the saturation values can be determined by obtaining $L^*a^*b^*$ values by applying a predetermined calculation to the obtained spectral reflectances. The saturation values are thus evaluated on the basis of the $L^*a^*b^*$ values. The amount of each of the CMYK inks that produces the minimum saturation, when various amounts of cyan ink, magenta ink, yellow ink, and black ink are added to the sample images of the black point, can be determined by the processing described above. Data obtained by adding the amount of each of the CMYK inks that produces the minimum saturation to grid point data (C, M, Y, K) corresponding to the black point is thus determined as new grid point data corresponding to the black point.

As described above, according to the present embodiment, grid point data corresponding to a black point is changed to data that can reduce saturation in equivalent luminance. Thus, the visual density of black images printed based on this data is higher than that based on data that is not processed as described above, for example, grid point data based on spectral characteristics themselves.

Second Embodiment

The second embodiment of the present invention uses the concept of the above-described equivalent luminance in adjusting gray balance.

Figure 3:
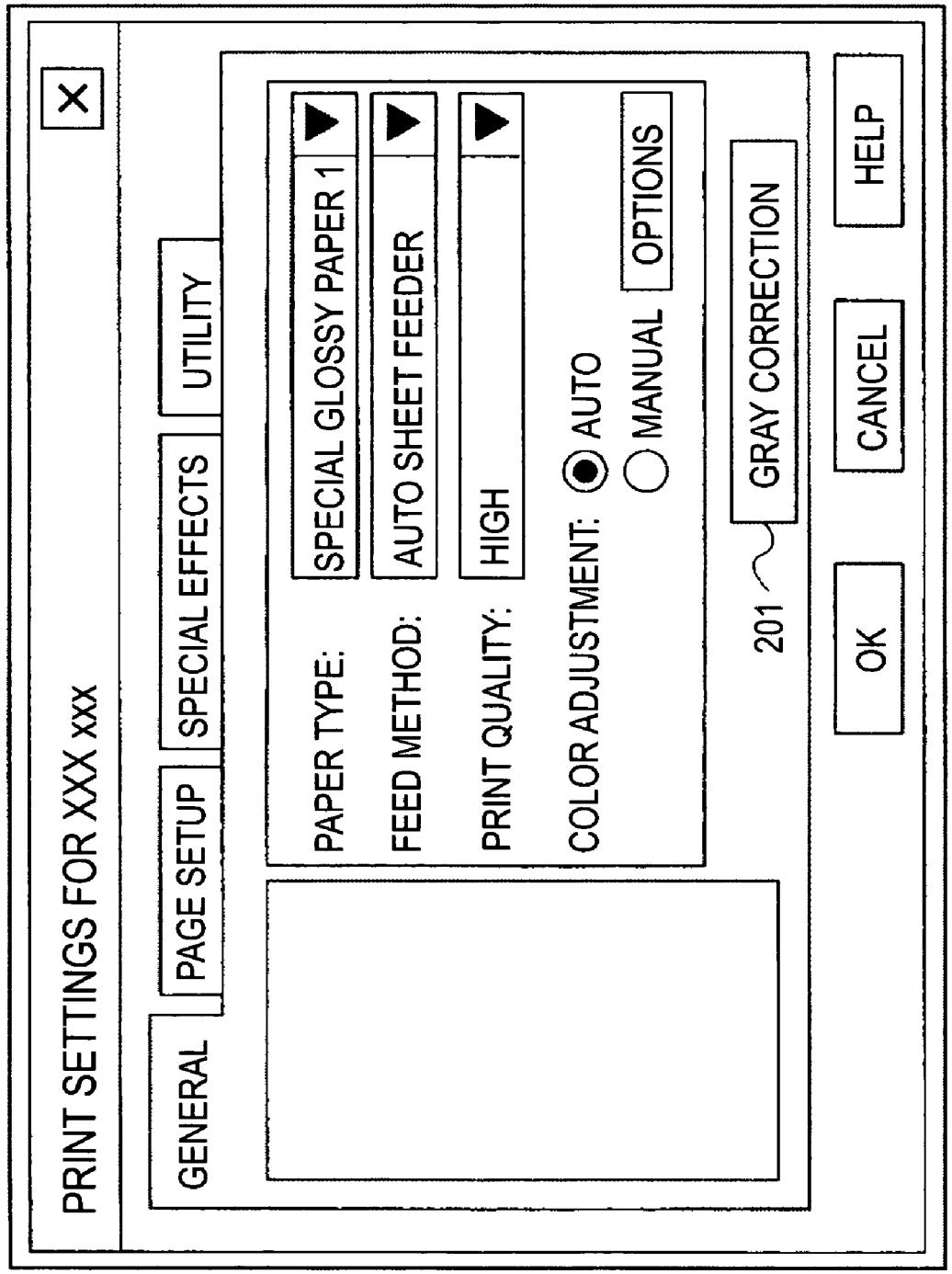
FIG. 3 shows an example of a setup dialog displayed by a printer driver in setting black or gray balance according to the embodiment.

FIG. 3 shows an example of a setup dialog displayed by a printer driver in setting black or gray balance according to the present embodiment. A button 201 is provided for performing gray correction. Selecting the button 201 initiates the process of gray correction.

Figure 4:
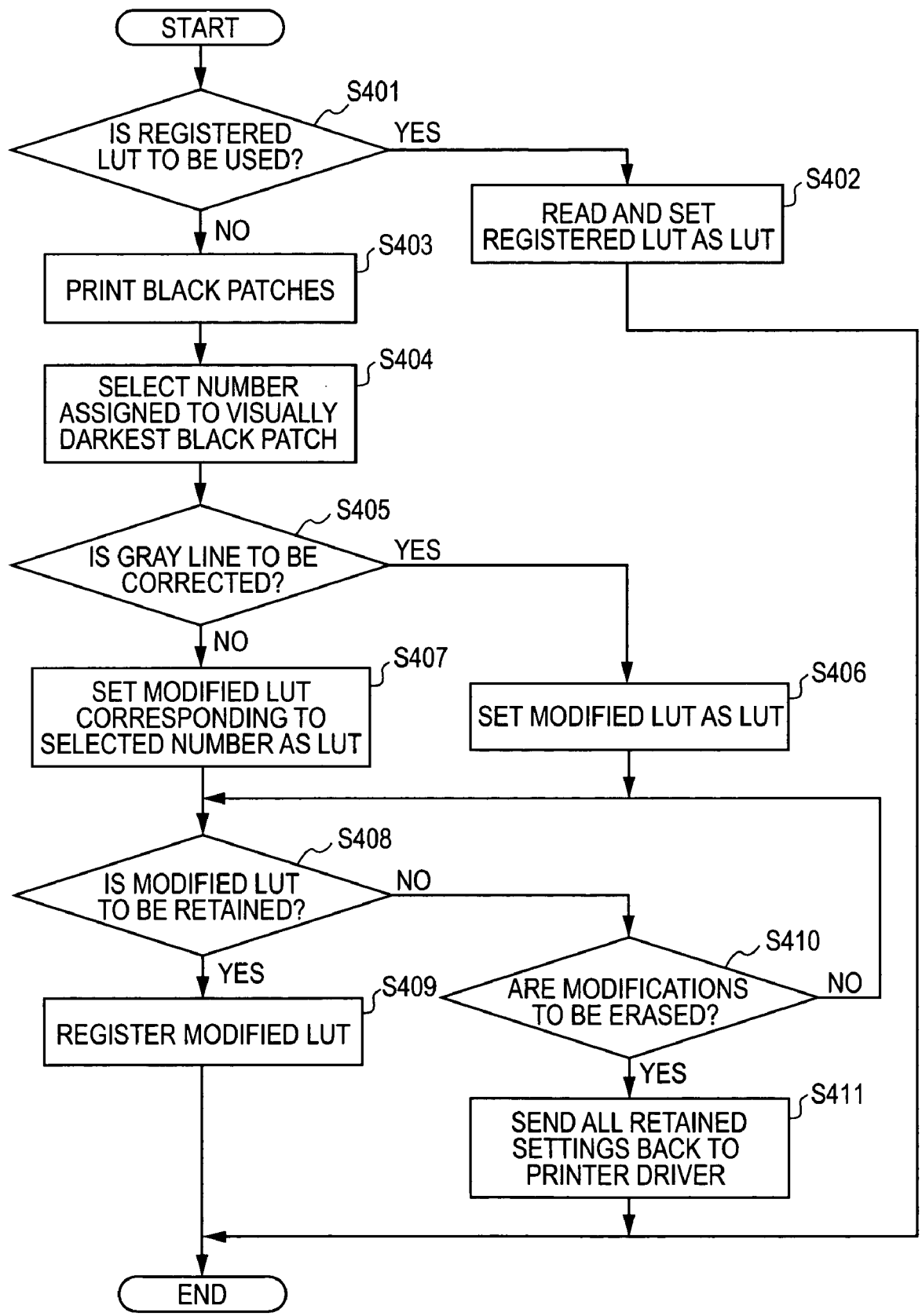
FIG. 4 is a flowchart showing the process of gray correction according to a second embodiment of the present invention.

FIG. 4 is a flowchart showing the process of gray correction. In step S401, it is determined whether or not an already registered LUT is to be used. If the registered LUT is to be used, the process proceeds to step S402 where the registered LUT is read and set as an LUT. The process then ends. If the registered LUT is not to be used, the process proceeds to step S403.

Figure 5:
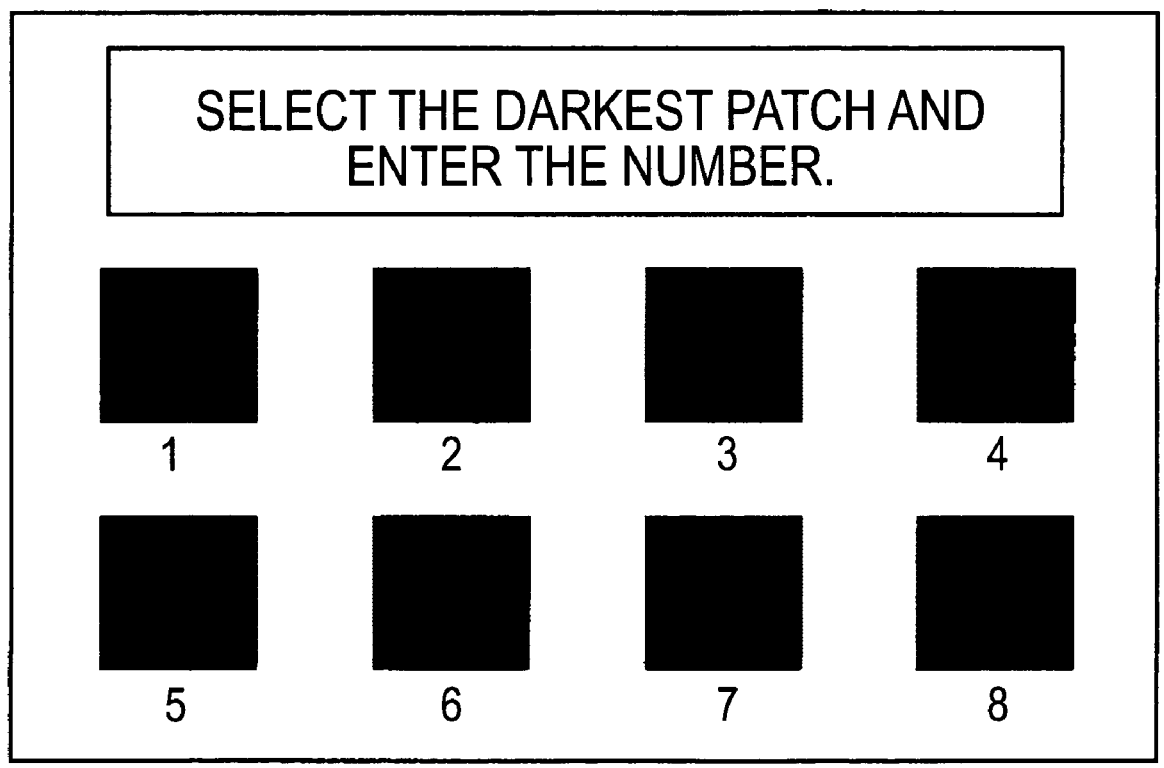
FIG. 5 shows an example of patches printed based on the grid point data (C, M, Y, K) corresponding to a black point and on the combinations of the amounts of CMYK ink varying with one another by a predetermined amount.

In step S403, patches are printed based on the grid point data (C, M, Y, K) corresponding to a black point (R, G, B)=(0, 0, 0) and on the combinations of the amounts of CMYK ink varying with one another by a predetermined amount. FIG. 5 shows an example of these patches. To create the first patch, the amount of color material corresponding to C of the grid point data is increased by a predetermined amount. To create the second patch, the amount of color material corresponding to M of the grid point data is increased by a predetermined amount. To create the third patch, the amount of color material corresponding to Y of the grid point data is increased by a predetermined amount. To create the fourth patch, the amount of color material corresponding to K of the grid point data is increased by a predetermined amount. To create the fifth patch, the amount of color material corresponding to C and M of the grid point data is increased by an amount smaller than the above-described predetermined amount. Eight patches are thus created according to the rules described above.

From the plurality of patches shown in FIG. 5, the user select a patch which appears to be the darkest black based on a visual check, and enters the corresponding number in a predetermined dialog of the printer driver. Similarly to the first embodiment, this sample printing and the processing described below are performed for each type of recording media, such as plain paper and glossy paper. In this case, if patches are not created using grid point data (C, M, Y, K) specific to each recording medium, the grid point data cannot be modified properly. Therefore, in creating the patches described above, information as to grid point data (C, M, Y, K) for what recording medium (e.g. plain paper or glossy paper) is used is created at the same time. Then, the user compares a recording medium actually used with the above-described information. If grid point data used in creating patches is incorrect, the user places a proper recording medium in the printer and can restart the above-described processing. If the printer is provided with a media sensor optically detecting the type of recording medium, and if the correspondence between the recording medium and grid point data is incorrect, the creation of patches can be cancelled based on detection by the media sensor.

In step S404, information for a patch selected according to the user's entry is obtained.

The processing for selecting the darkest black described above may be performed according to the first embodiment.

In step S405, it is determined whether or not gray lines are to be corrected. This determination is made by evaluating continuity between modified grid point data (C, M, Y, K) corresponding to a black point and grid point data (C, M, Y, K) in the vicinity of the black point. Specifically, if it is determined that the continuity is lost, CMYK data for other grid points on the gray lines is also changed. A gray line is a line for connecting a black point to a white point (white color of a recording medium). If it is determined that the correction of gray lines are to be performed, the process proceeds to step S406, where gray correction is performed according to C, M, Y, and K values of the selected patch. That is, similarly to the first embodiment, the values of C, M, Y, and K in the LUT are determined to minimize the saturation of each of the plurality of grid points constituting the gray lines, and are determined to be new grid point data. Thus, a modified LUT in which the equivalent luminance and color of gray lines are adjusted is set as the LUT.

If it is determined in step S405 that the correction of gray lines is not to be performed, grid point data (black point data) corresponding to (R, G, B)=(0, 0, 0) is updated with C, M, Y, and K values corresponding to the number selected in step S404, and a modified LUT with the updated contents is set as the LUT in step S407.

After setting a modified LUT as the LUT (step S406 or step S407, processing proceeds to step S408. In step S408, it is determined whether or not the modified LUT set in the previous steps is to be retained. If it is determined that the modified LUT is not to be retained, it is determined in step S410 whether or not the adjustments are to be erased. If the adjustments are to be erased, the process proceeds to step S411 and retained settings are all sent back to the printer driver. The process then ends.

If it is determined in step S410 that the adjustments are not to be erased, processing returns to step S408.

If it is determined in step S408 that the modified LUT is to be retained, the process proceeds to step S409 where the modified LUT is registered. The process then ends. The contents registered here may be retained until the next gray correction, or may be read out and used as necessary.

In the processing described above, black density is evaluated not only based on black measured by a spectrophotometer or the like, but also on luminance depending on the color. Then, images including black and the like are printed according to the amount of color material obtained by color conversion performed based on the evaluation. Black density visually observed can thus be increased. Moreover, the proper density balance of gray scale can be achieved using the evaluation described above.

Third Embodiment

To set color tones with appropriate gray balance in grayscale printing, the gray balance is made different from that in color printing, since the color tones of gray do not affect the colors of skin and the like in grayscale printing. An LUT used in the third embodiment of the present invention is the one used for evaluating equivalent luminance in grayscale printing, and is different from that used in color printing.

Other Embodiments

The present invention is applicable not only to systems composed of a plurality of apparatuses (e.g. a host computer, an interface apparatus, a reader, and a printer), but also to independent apparatuses (e.g. a copier and a facsimile).

In the present invention, to allow various devices to operate to achieve the functions of the embodiments described above, software (program code) for performing the functions of the above-described embodiments may be supplied to a computer in a system or apparatus connected to the various devices. A mechanism may be used for implementing the computer (CPU or micro-processing unit (MPU)) in the system or apparatus by having the various devices operate according to a program stored in the computer. In this case, the software program code itself performs the functions of the above-described embodiments.

Examples of storage media storing such program code include, but are not limited to, a floppy disk, a hard disk, an optical disk, a magneto-optical disk, a compact-disk read-only memory (CD-ROM), a CD-recordable (CD-R), a magnetic tape, a non-volatile memory card, and a ROM.

The functions of the above-described embodiments are performed by a computer executing program code supplied thereto. Specifically, the functions of the above-described embodiments are performed by the program code that operates in cooperation with an operating system (OS) running on the computer or with other application software.

In the present invention, moreover, supplied program code may be stored in a memory of a function expansion board in a computer or in a memory of a function expansion unit connected to a computer. Then, a CPU or the like in the function expansion board or expansion unit executes all or part of the actual processing based on instructions of the program code, thus performing the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-322751 filed Nov. 5, 2004, which is hereby incorporated by reference herein in its entirety.

What is claimed is:

1. An image processing method for forming a color conversion table that coverts image data corresponding to black into image data corresponding to an amount of color material to be used in printing, the image processing method comprising:

changing grid point data for converting the image data corresponding to black into black-density-increased data corresponding to an amount of color material that reduces saturation, wherein the black-density-increased data is decided based on equivalent luminance expressed by the sum of measured luminance and luminance depending on the color, by reducing the luminance depending on the color.

2. The image processing method according to claim 1, wherein a value of luminance depending on the color in the equivalent luminance is set based on the predetermined amount of color material corresponding to black to adjust a color tone of a gray line.

3. The image processing method according to claim 1, wherein the image data corresponding to black is represented by brightness signals R, G, and B, and the black is expressed as (R, G, B)=(0, 0, 0).

4. A computer-readable medium having stored thereon a program having a computer function as an image processing apparatus for forming a color conversion table that converts image data corresponding to black into image data corresponding to an amount of color material to be used in printing to perform an image processing method comprising:

changing grid point data for converting the image data corresponding to black into black-density-increased data corresponding to an amount of color material that reduces saturation, wherein the black-density-increased data is decided based on equivalent luminance expressed by the sum of measured luminance and luminance depending on the color, by reducing the luminance depending on the color.

5. The computer-readable medium according to claim 4, wherein a value of luminance depending on the color in the equivalent luminance is set based on the predetermined amount of color material corresponding to black to adjust a color tone of a gray line.

6. The computer-readable medium according to claim 4, wherein the image data corresponding to black is represented by brightness signals R, G, and B, and the black is expressed as (R, G, B)=(0, 0, 0).

7. An image processing apparatus for forming a color conversion table that converts image data corresponding to black into image data corresponding to an amount of color material to be used in printing, the image processing apparatus comprising:

a changing unit for changing grid point data for converting the image data corresponding to black into black-density-increased data corresponding to an amount of color material that reduces saturation, wherein the black-density-increased data is decided based on equivalent luminance expressed by the sum of measured luminance and luminance depending on the color, by reducing the luminance depending on the color.

8. The image processing apparatus according to claim 7, wherein a value of luminance depending on the color in the equivalent luminance is set based on a predetermined amount of color material corresponding to black, thus adjusting a color tone of a gray line.

9. The image processing apparatus according to Claim 7, wherein the image data is represented by brightness signals R, G, and B, and the black is expressed as (R, G, B)=(0, 0, 0).

* * * * *